US008464063B2

(12) United States Patent
Agarwal et al.

(10) Patent No.: US 8,464,063 B2
(45) Date of Patent: Jun. 11, 2013

(54) TRUSTED GROUP OF A PLURALITY OF DEVICES WITH SINGLE SIGN ON, SECURE AUTHENTICATION

(75) Inventors: Amit Agarwal, Milpitas, CA (US); Mehmet Balasaygun, Freehold, NJ (US); Swapnil Kamble, Pune (IN); Raj Sinha, West Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 8 days.

(21) Appl. No.: 13/042,201

(22) Filed: Mar. 7, 2011

(65) Prior Publication Data

US 2011/0225426 A1    Sep. 15, 2011

Related U.S. Application Data

(60) Provisional application No. 61/312,511, filed on Mar. 10, 2010.

(51) Int. Cl.
*H04L 9/32* (2006.01)
(52) U.S. Cl.
USPC .......................................... 713/175; 709/224
(58) Field of Classification Search
None
See application file for complete search history.

(56) References Cited

U.S. PATENT DOCUMENTS

| 7,171,473 | B1 | 1/2007 | Eftis et al. | |
|---|---|---|---|---|
| 7,818,020 | B1* | 10/2010 | Manroa et al. | 455/519 |
| 7,864,716 | B1* | 1/2011 | Manroa et al. | 370/260 |
| 7,933,836 | B2 | 4/2011 | Erhart et al. | |
| 2003/0172090 | A1* | 9/2003 | Asunmaa et al. | 707/200 |
| 2004/0225878 | A1* | 11/2004 | Costa-Requena et al. | 713/150 |
| 2006/0117098 | A1* | 6/2006 | Dezonno et al. | 709/223 |
| 2006/0224744 | A1* | 10/2006 | Rao et al. | 709/227 |
| 2007/0067443 | A1 | 3/2007 | Seligmann et al. | |
| 2007/0162963 | A1 | 7/2007 | Penet et al. | |
| 2008/0086564 | A1* | 4/2008 | Putman et al. | 709/227 |
| 2009/0022145 | A1* | 1/2009 | Bakshi et al. | 370/352 |
| 2009/0116632 | A1* | 5/2009 | Shen et al. | 379/207.16 |
| 2009/0125972 | A1 | 5/2009 | Hinton et al. | |
| 2010/0056105 | A1 | 3/2010 | Erhart et al. | |
| 2010/0079256 | A1 | 4/2010 | Erhart et al. | |
| 2010/0082479 | A1 | 4/2010 | Erhart et al. | |
| 2010/0082977 | A1 | 4/2010 | Boyle et al. | |
| 2010/0145739 | A1 | 6/2010 | Erhart et al. | |

(Continued)

OTHER PUBLICATIONS

"Federated Trusted Network Connect (TNC) FAQ," at http://www.trustedcomputinggroup.org/resources/federated_trusted_network_connect_tnc_faq, date unknown, 3 pages.

(Continued)

*Primary Examiner* — Brandon Hoffman
*Assistant Examiner* — Carlos Amorin
(74) *Attorney, Agent, or Firm* — Sheridan Ross P.C.

(57) ABSTRACT

A system creates a trusted group of devices for single sign on. The trusted group is a set of two or more devices which can communicate securely to exchange information about the states of the devices. The two or more devices can arrange or establish the trusted group through the exchange of credentials or authentication information. After the establishment of the trusted group, the two or more devices may communicate through a secure connection established between the members of the trusted group. Each device may then execute normally and may encounter events that change the status of the device. Information about the locking or unlocking of the computer can be exchanged with the other members of the trusted group and the other members may also lock or unlock in concert.

20 Claims, 6 Drawing Sheets

U.S. PATENT DOCUMENTS

| | | | |
|---|---|---|---|
| 2010/0217837 A1* | 8/2010 | Ansari et al. | 709/218 |
| 2010/0246800 A1 | 9/2010 | Geppert et al. | |
| 2010/0251124 A1 | 9/2010 | Geppert et al. | |
| 2010/0251142 A1 | 9/2010 | Geppert et al. | |
| 2010/0251158 A1 | 9/2010 | Geppert et al. | |
| 2010/0322407 A1 | 12/2010 | Erhart et al. | |
| 2011/0066423 A1 | 3/2011 | Erhart et al. | |
| 2011/0071889 A1 | 3/2011 | Erhart et al. | |
| 2011/0103265 A1* | 5/2011 | Dilipkumar Saklikar et al. | 370/259 |
| 2011/0131414 A1* | 6/2011 | Cheng et al. | 713/170 |
| 2011/0162058 A1* | 6/2011 | Powell et al. | 726/9 |
| 2011/0209193 A1 | 8/2011 | Kennedy | |
| 2012/0084349 A1* | 4/2012 | Lee et al. | 709/203 |
| 2012/0089728 A1* | 4/2012 | Deruijter et al. | 709/224 |

OTHER PUBLICATIONS

"Single sign-on Solution for Cisco IP-phones: ALM Single Sign-on (SSO)," Spectra Technology Solutions, http://www.spectra-ts.nl/default.asp?name=solutions&page=1, 2010, 1 page.

Day et al., "RFC 2778—A Model for Presence and Instant Messaging," Network Working Group, Internet Engineering Task Force, Feb. 2000, pp. 1-17.

Website at http://www.rsconnect.net, 2008, 1 page.

Search Report for UK Patent Application No. GB1104092.0, dated Jul. 8, 2011.

Background of the Invention for the above-captioned application filed Mar. 7, 2011 (previously provided).

* cited by examiner

TRUSTED GROUP OF A PLURALITY OF DEVICES WITH SINGLE SIGN ON, SECURE AUTHENTICATION

BACKGROUND

Corporate employees typically use several devices to complete their tasks for their jobs. These devices can include a desktop personal computer, a laptop computer, a cell phone, a desktop telephone, personal digital assistant, and other electronic devices. During the course of any day, the corporate employee may use each device in concert or singly to complete tasks. Many of these devices have systems that will electronically lock or unlock the device depending upon the current state of usage for that device. Locking involves the execution of a user interface or other application that requires a user to restart the device, repower the device, or reenter credentials to use the device. For example, a desktop computer may execute a screen saver that requires a password to disable the screen saver if there is no activity with the desktop computer over several minutes. Other devices may have similar types of programs that ensure the safety and security of the devices. Unfortunately, these types of lock and unlock applications can create distractions and problems for corporate users.

When a corporate user is employing only a single device, the other devices associated with that user may all lock. For example, during a long conference call, the desktop computer may not be used during the call. After several minutes, the desktop computer may lock preventing instant access by the user without the user entering in authentication information into the computer. Thus, if there is a sudden need for information stored on the desktop computer during the conference call, the user will need to enter authentication information into the computer, which slows the user's access to the information. As such, there is a need to coordinate the activities of a user's several devices, such that no one device may lock or unlock without knowledge of the user's usage of other devices within a group of the user's devices.

SUMMARY

It is with respect to the above issues and other problems that the embodiments presented herein were contemplated. Embodiments described in the present application provide a trusted group. A trusted group is a set of two or more devices which can communicate securely to exchange information about the states of the devices. The two or more devices can arrange or establish the trusted group through the exchange of credentials or authentication information. After the establishment of the trusted group, the two or more devices may communicate through a secure connection established between the members of the trusted group. Each device may then execute normally and may encounter events that change the status of the device. For example, if a desktop computer is left unattended for a period of time, the desktop computer may lock. Information about the locking of the computer can be exchanged with the other members of the trusted group. The other members of the trusted group may also lock in concert with the desktop computer. In other embodiments, the desktop computer may receive information that the mobile phone of the trusted group is active, and thus, forgo locking. As such, the members of the trusted group may interact and work in concert to ensure that all devices are available or locked depending upon the state of the several members of the trusted group.

The embodiments provide a unique system and method for creating a trust federation and limited common control among a user's smart communications devices. The trust federation or trust group allows for the capabilities of user identity determination, network and authentication/security discovery, device discovery, proximity determination, activity detection, user presence detection to allow Single Sign On, single device lock/unlock, coordinated inactivity time out (or other power saving time out provisions). This functionality is provided among all of the user's devices and can be actuated from any of the plurality of devices joined to the trusted group. The communications devices in the trusted group may include, but are not limited to, desk phones, cell phones, pagers, personal computers, personal digital assistants, etc.

A group of communications devices can join a trusted group. The communications device can be associated with heterogeneous networks. Each device may have a unique and mutually exclusive turn on procedure, sign on procedure, certificate authority, and the like. The trusted group may be formed through SIP, XML, or other equivalent signaling between the devices possessing a trusted group software application. The trusted group software application may have one or more of, but is not limited to, the following capabilities and/or elements: 1) the ability to determine the identity of a user and what permissions and trust are associated with that user; 2) the ability to negotiate trust between different networks, different certificate authorities, among devices and/or services, licensed by differing service providers, and with differing user persona (e.g., a personal cell phone versus a business cell phone); 3) the ability to determine the type of device, device capabilities, device limitations, and other device information; 4) the ability to unlock and authenticate via a more secure mechanism, for example, biometrics; 5) the ability to determine proximity of a user's devices via a presence system using information, such as, GPS, Geofencing, Bluetooth, etc.; 6) the ability, via presence information or other similar methodology, to establish activity across all devices in the associated group; 7) the ability to read predefined smart communications device preferences that the user may establish to define the parameters associated with authentication, trust, certificate sharing, activity time out, etc.; and 8) the ability to manage inactivity and/or power saving features among less intelligent devices such as monitors, keyboards, pointing devices, projectors, printers, etc. that may be connected via wired or wireless connections to the smart communications devices in the trusted group.

The embodiments can include a software application and an associated communication channel possessing SIP, XML, or other signaling that may be available on the smart communications devices. Alternatively, in the case of time out control of less intelligent associated devices communicating with smart communications devices, the software application may be resident on the associated intelligent devices and the signaling may be via a wired or wireless links, such as, USB, Firewire, IRDA, Bluetooth, 802.11, etc. Since the system and method make use of SIP, XML, USB, Firewire, etc. and with a software application resident on the smart communications devices, the trusted group can be extended to multivendor, multi-network, multi-provider environments.

The SIP signaling improvement offers the advantages of being able to automatically conduct device discovery using a SIP communication channel. When the discovery is complete or a previously completed discovery is checked against the current devices possessed by the user, the single sign-on (SSO) applications can join together and create a trust group that associates various devices in a federated logical trusted relationship with common control. Credentials between devices are shared to allow mutual unlock/lock of each other. For example, in the case of a personal computer, the SSO application on the phone will have the credentials for the personal computer and the phone can integrate the personal computer login service, such that the phone can direct the personal computer to unlock. This method is the case for cross network or dissimilar system configurations between devices. The SSO application is a trusted application for all devices on the system and can unlock any device without requiring additional authorization. An advantage of the system is that dissimilar devices on heterogeneous networks can unlock/lock and authenticate bilaterally. Further, this advantage is achieved without sharing tokens but rather through direct permissions received via the application and the login credential of the devices.

The user can select a specific device that meets the criteria for security, ease of use, and the like to enter their credentials for login and other information that uniquely identifies the association in the SSO trust group. At this time, the application uses the capabilities and/or elements listed above to effectively join the user to the smart communication device trust group and turn on and/or authenticate the user's devices based on accessing the selected specific device. At the time of configuration of the system and method, the user can advantageously set policies or settings for how to lock, unlock, authenticate, and/or complete timeout coordination of the various smart communications devices. Control of less intelligent devices linked to the smart communications devices may also be done based on settings that the user establishes at the time of system or method configuration.

Devices may be described in the graphical communications metaphor. Specifically, the device, via a touch screen, camera, or other technology can offer more secure access via one or more finger print scans, iris detection, etc. The touch screen can be used to authenticate a finger print rather than relying on a deliberate scan over a thumbprint scanner. Improvements to the graphical communications metaphor device can extend these capabilities as additional capabilities and applications are added to the device. For example, the device might feature an application that detects whether atypical behavior has been spotted with regard to the device usage and can trigger the device to go into a protection mode. Other variations on this theme are also possible.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

Providing presence information and determining presence can be as described in U.S. Pat. No. 7,171,473, entitled "System using HTTP protocol for maintaining and updating on-line presence information of new user in user table and group table," issued Jan. 30, 2007, and U.S. Patent Publication No. 20070067443, entitled "Presence-based hybrid peer-to-peer communications," filed Sep. 30, 2005, which are incorporated herein in their entirety for all that the patents teach. Presence information and the determination of presence can be as further described in the Network Working Group Request for Comments: 2778, authored by M. Day, J. Rosenberg, and H. Sugano, published by the Internet Engineering Task Force on February 2000, and entitled "A Model for Presence and Instant Messaging," which is incorporated herein in the document's entirety for all that the document teaches.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
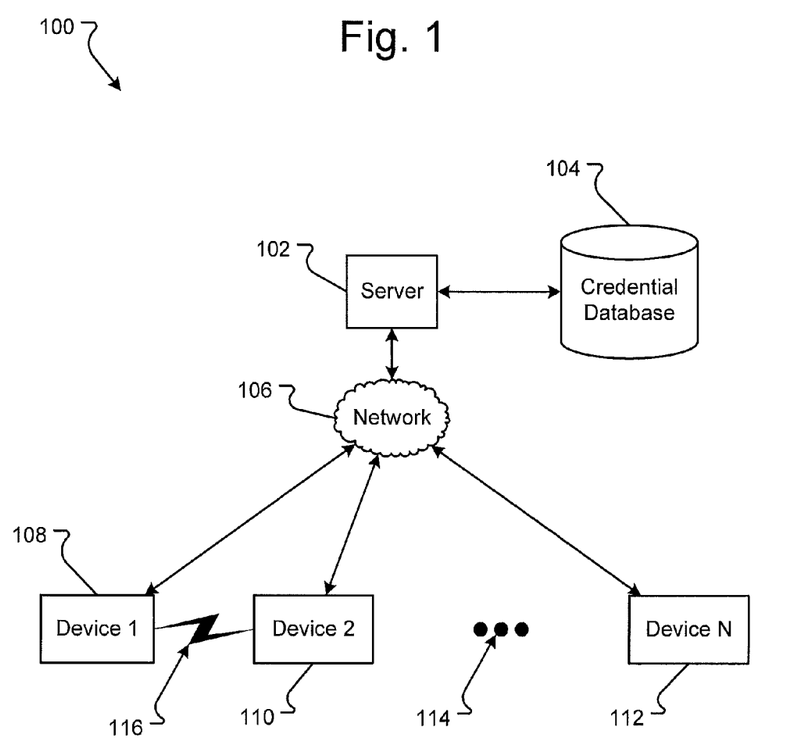
FIG. 1 is a block diagram of an embodiment of a trusted group of devices.

A system 100 for establishing and conducting a trusted group is shown in FIG. 1. The trusted group can be formed with two or more devices, such as device 1 108, device 2 110 and device N 112. There may be more or fewer devices than those shown in FIG. 1, as represented by ellipses 114. The several devices 108, 110, and/or 112 form the members of the trusted group. Each device 108, 110, and/or 112 may communicate with the other devices 108, 110, and/or 112 either directly through a wireless link or a wired link or may communicate to the other devices 108, 110, and/or 112 through a network 106. As such, each device 108, 110, and/or 112 may exchange information with the other devices 108, 110, and/or 112 both to form and to conduct the trusted group.

A device 108, 110, and/or 112 may be any communications device used by a user to communicate. For example, a device 108, 110, and/or 112 may be a smart communications device, such as, an IP-enabled desktop telephone, a cellular phone, a personal digital assistant, etc. Further the devices 108, 110, and/or 112 may include one or more computing systems, such as, a laptop computer, a desktop computer, a personal digital assistant, etc. Regardless, the user may establish a trusted group with any of two or more electronic devices with which the user employs to conduct business. In embodiments, the one or more devices 108, 110, and/or 112 are IP-enabled devices such that the devices 108, 110, and/or 112 may establish a presence on a network and receive an IP address. The smart communication devices may also use Session Initiation Protocol (SIP) to communicate, establish a presence, and/or receive or send SIP communications.

Further, the devices 108, 110, and/or 112 may be able to communicate through one or more protocols including either 802.11G or N standards, Bluetooth communications, or other types of communications. The one or more devices 108, 110, and/or 112 may be computer devices or computing systems as described in conjunction with FIGS. 5 and 6. As such, each device 108, 110, and/or 112 may execute applications with a processor and store those applications in memory. Further, the devices 108, 110, and/or 112 may store data or information used in the establishment or conduct of trusted groups. The devices 108, 110, and/or 112 may also be able to send or receive SIP messages either from one of the other device members 108, 110, and/or 112 of the trusted group or other systems.

Each device 108, 110, and/or 112 may, as part of its security system, execute systems that lock or unlock the device. For example, the device 108, 110, and/or 112 may use a screen saver or other program that has a password protection or other authentication requirement that will activate upon non-use of the device 108, 110, and/or 112 after a predetermined period of time (e.g. one minute, five minutes, etc.). Other devices 108, 110, and/or 112 may have similar lock or unlock systems that prevent access to the device 108, 110, and/or 112 during states of inactivity or during certain events either conducted by a user or that may occur automatically. In embodiments, a device 108, 110, and/or 112 may also be an application executed on a hardware device, for example, a soft telephone application executed on a computer system. Further, a device 108, 110, and/or 112 may also be a server, which is unrelated to any single user, but may conduct operations for several users and may be used by a single user for specific applications.

Each device 108, 110, and/or 112 may also include presence information. Presence information may include both physical location information and information about the device's activity on a network. For example, presence information can include a latitude and longitude pair or some other specific geographic or physical location that may be shared with one or more other devices 108, 110, and/or 112. Presence information can also include the presence of the device 108, 110, and/or 112 on a certain network, such as a subnet of a local area network (LAN). For example, the SIP registration of a device 108, 110, and/or 112 to a device or an application can provide presence of the device 108, 110, and/or 112 on the network. The presence information may be used to determine the response to an event, which may include a lock or unlock state for one or more of the devices 108, 110, and/or 112.

The devices 108, 110, and/or 112 may communicate through a network 106. The network may be a LAN, a wide area network, (WAN), a wireless LAN, wireless WAN, or other types of networks. In embodiments, the network 106 can include two or more networks, which may include the Internet. The network 106 communicates with each device 108, 110, and/or 112 may be through the same or different protocols, which may include 802.11G or N protocols, Bluetooth, TCP/IP, etc. The one or more devices 108, 110, and/or 112 may also communicate with the server 102.

Figure 5:
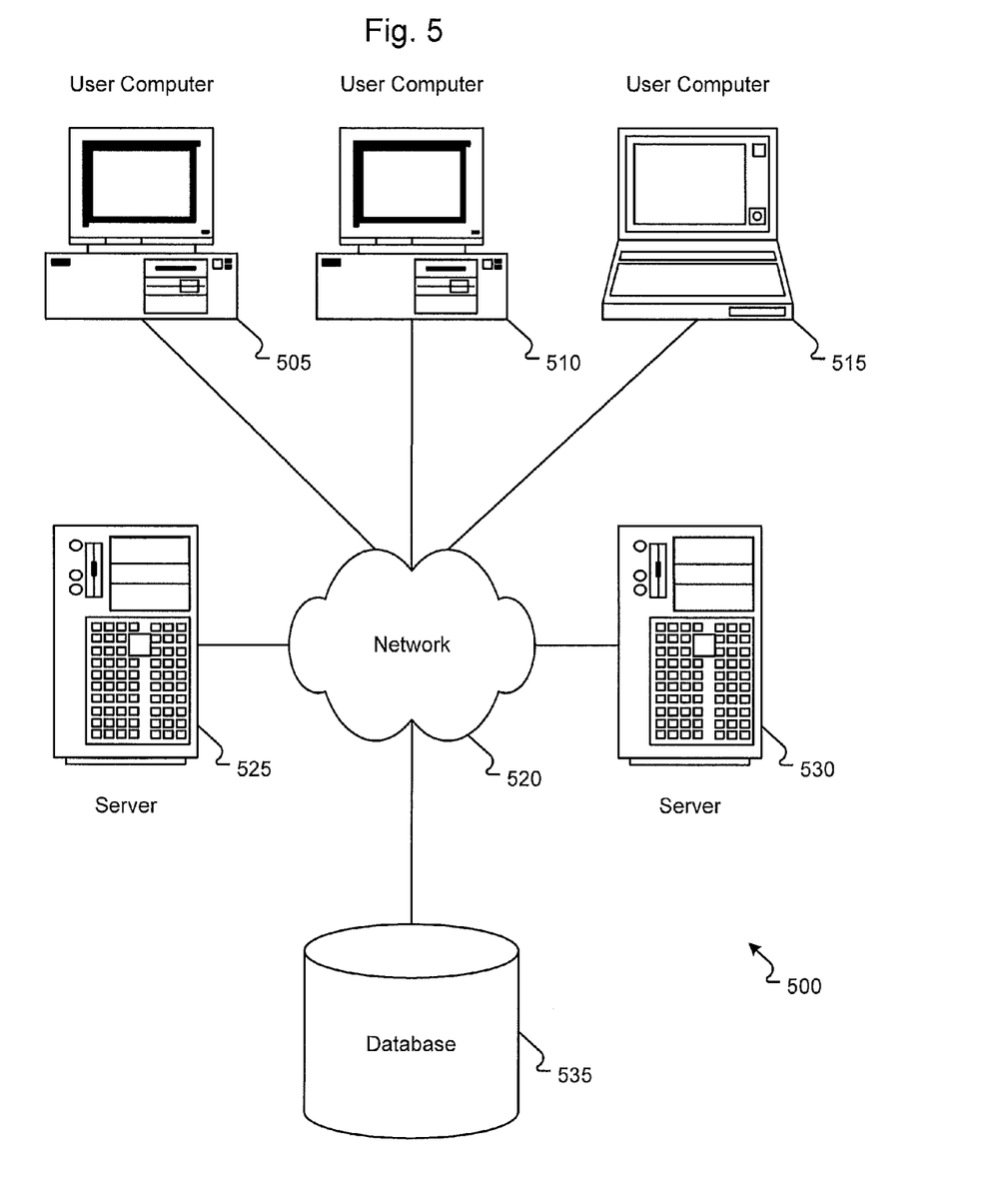
FIG. 5 is a block diagram of an embodiment of a computing environment operable to execute the embodiments described herein.
Figure 6:
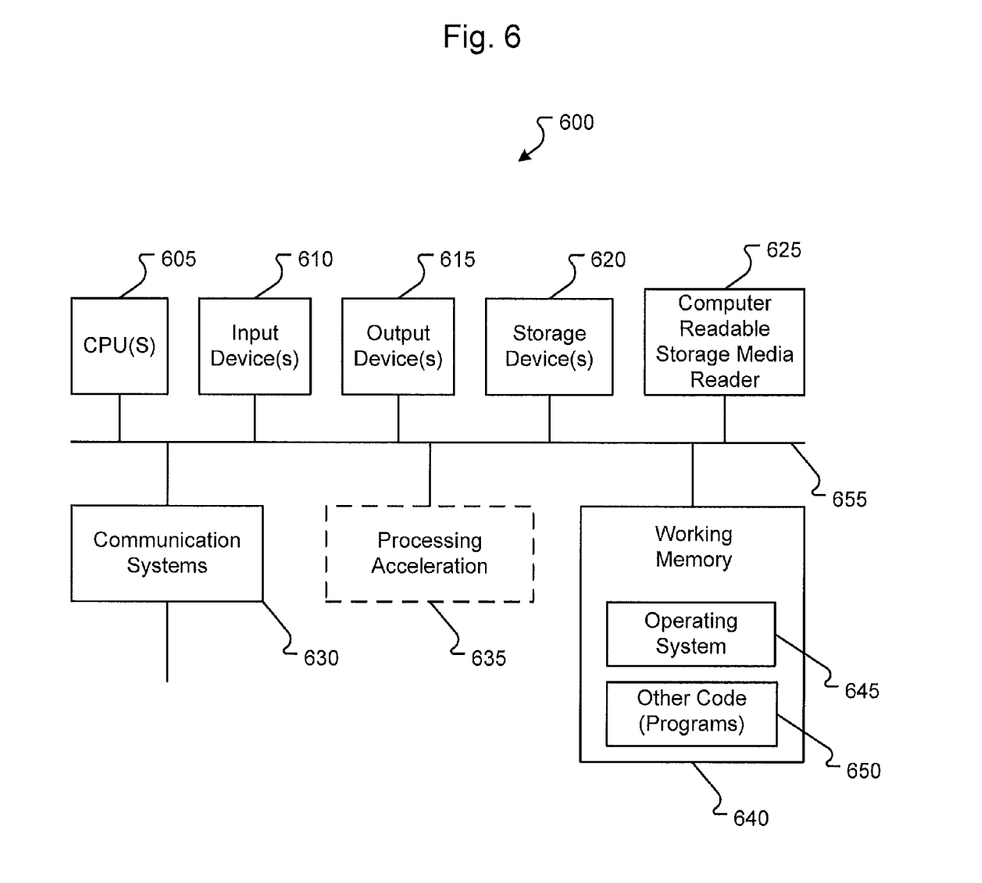
FIG. 6 is a block diagram of an embodiment of a computer or computing system environment operable to execute as the one or more devices described herein.

The server 102 can be a computer system, as defined in conjunction with FIGS. 5 and 6. The server 102 may be able to execute one or more applications that provide the exchange of information between devices 108, 110, and/or 112 to establish a trusted group. Further, the server 102 may execute applications that provide credential information to one or more devices 108, 110, and/or 112. The credential information may be stored in a credential database 104 which may be any type of database as described in conjunction with FIGS. 5 and 6. The credentials database 104 may store one or more credentials used for the lock or unlock applications executed by the devices 108, 110, and/or 112.

Figure 2:
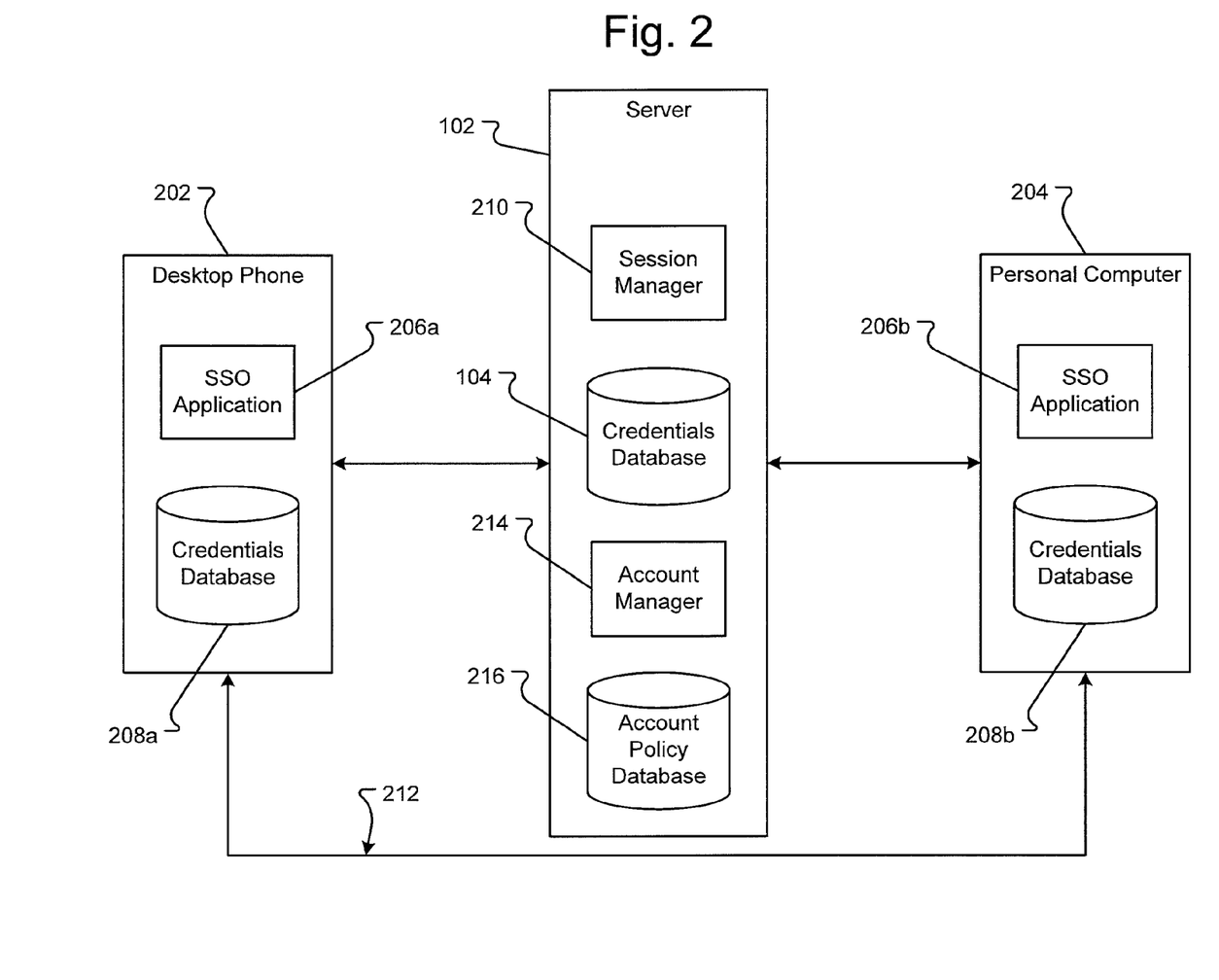
FIG. 2 is a block diagram of an embodiment of a system for creating and administering the trusted group.

An embodiment of a system 200 having a trusted group is shown in FIG. 2. The system 200 includes only two devices. However, the trusted group with only two devices should not be construed as the only possible embodiment as the trusted group can have two or more devices. A desktop phone 202 and a personal computer 204 are members of a trusted group. The system 200, as shown in FIG. 2, is only one example of a configuration for a trusted group. The trusted group may have different types of devices included in the trusted group.

The desktop phone 202 and personal computer 204 may also communicate with a server 102. The server 102 may be a separate computer system from the desktop phone 202 and personal computer 204 that executes different applications to facilitate the creation and conduct of the trusted group. However, in alternative embodiments, the applications that are executed or the systems facilitated or provided by the server 102 may be provided by one or more of the members of the trusted group rather than the server 102. For example, each of the different members of the trusted group may have a database to store the information, which is provided by the server 102, as part of the device. Further, the applications executed by the server may also or instead execute on one or more of the members of the trusted group. For simplicity of explanation, the system 200 is provided to explain the different features of the devices and the applications that may execute on the devices or the server in order to create or facilitate a trusted group.

Each device, such as the desktop phone 202 and personal computer 204, can execute a SSO application 206 and include a credentials database 208. Each device 202 and/or 204 can be a computer system, as described in conjunction with FIGS. 5 and 6. As such, each device 202 and/or 204 can include a processor and memory or any other components necessary to execute applications or store data or information in device memory.

The SSO application 206 is operable to establish the trusted group and to exchange events of one or more other members of the trusted group. The credentials database 208 is operable to store credentials for the device and other members of the trusted group. As such, the SSO application 206 can have access to other device credentials that may be used in sending messages between the members of the trusted group.

The server 102 can be a computer system as described in conjunction with FIGS. 5 and 6. The server 102 may thus include a processor and memory and may be able to execute the applications or store data as described hereinafter. The server 102 can execute a session manager 210. The session manager 210 is an application that can coordinate the exchange of messages to establish a trusted group between devices 202 and 204. Thus, the session manager 210 is operable to receive messages, such as SIP messages, to register and notify the devices of the presence of other members of the trusted group. The server 102 may also include a credentials database 104, which may store the credentials of all members of the trusted group. Thus, as members are added to the trusted group, the credentials from credentials database 104 can be provided to the new members. Further, during the initial provision or establishment of the members of the trusted group, the credentials database 104 can exchange or share the credentials with the other members of the trusted group.

The server 102 can also execute an account manager 214. The account manager 214 can be an application and can be operable to manage the information and the conduct of the trusted group. As such, the account manager 214 can receive policies or directives from the user that creates the trusted group. These user defined policies can dictate how the trusted group will interact and respond to events, such as unlock or lock states. The user defined criteria is included in an account policy database 216. The account policy database 216 can be any type of database as described in conjunction with FIGS. 5 and 6. The account policy database 216 may include authentication rules or polices that are provided from different systems, such as Microsoft Exchange Server or other types of protocols or systems used in networking the devices 202 and 204. All of the different information may be provided to the account manager 214 to establish rules for the conduct and establishment of the trusted group.

After the establishment of the trusted group, the different members or devices 202 and 204 of the trusted group can communicate directly with each other. For example, the devices 202 and 204 can communicate through connection 212. In embodiments, the connection 212 is a secured connection. For example, the connection 212 may be a persistent transport layer security (TLS) connection. The connection 212 can be established through the exchange of direct socket information that allows each of the trusted group to receive event information over the persistent TLS connection 212 on a port that is listened to by the members of the trusted group. If the network configuration or registration of a device may change, the device may go through the server 102 or directly to the another device(s) to reestablish the connection 212 to continue to receive event information.

Figure 3:
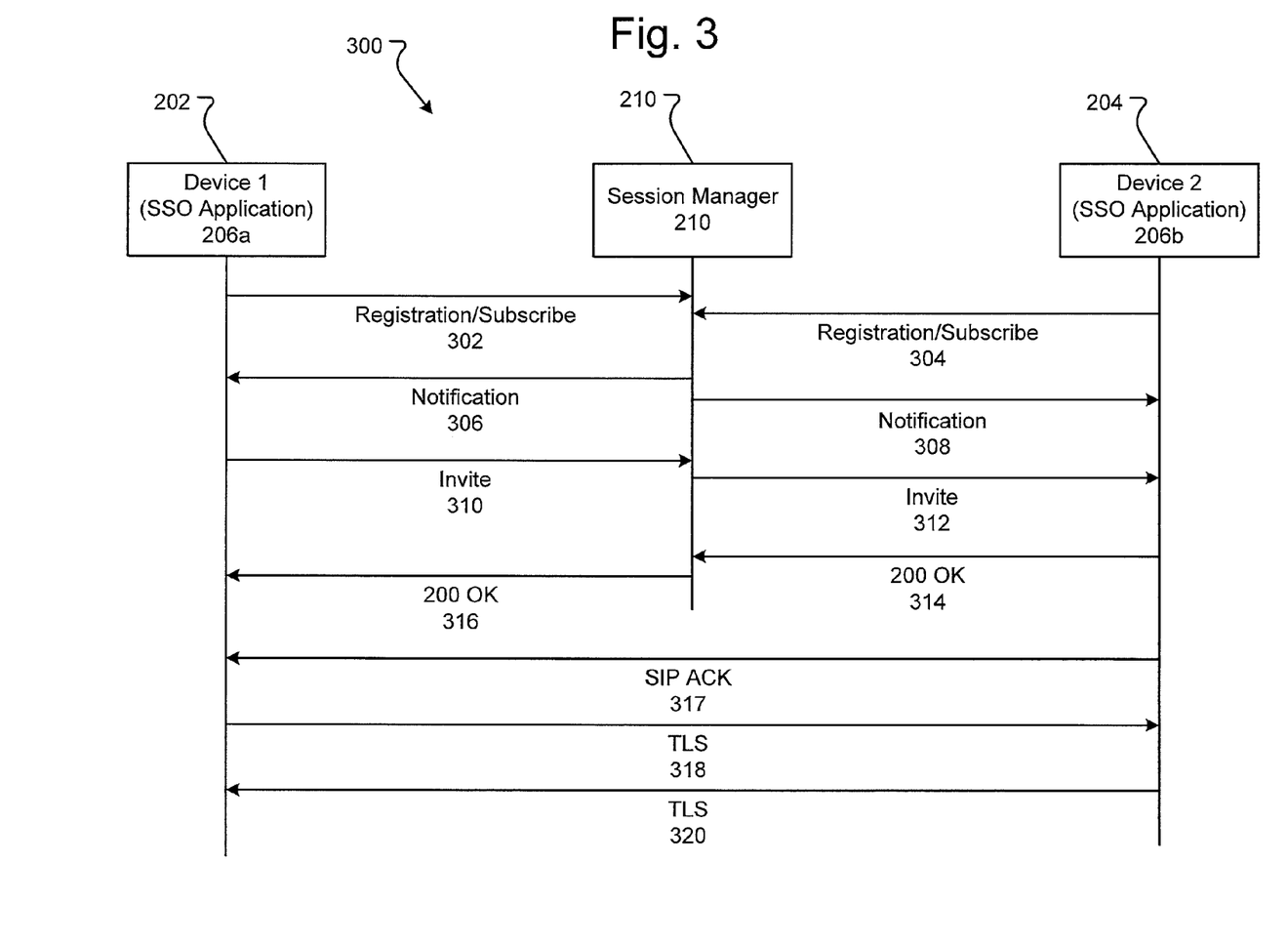
FIG. 3 is a flow diagram of an embodiment of a process for establishing a trusted group.

An embodiment of a method to establish a trusted group is shown in FIG. 3. Generally, the method 300 begins with a start operation and terminates with an end operation. While a general order for the steps of the method 300 are shown in FIG. 3, the method 300 can include more or fewer steps or arrange the order of the steps differently than those shown in FIG. 3. The method 300 can be executed as a set of computer-executable instructions executed by a computer system and encoded or stored on a computer readable medium. Hereinafter, the method 300 shall be explained with reference to the systems, components, modules, data structures, user interfaces, etc. described in conjunction with FIGS. 1-2.

The trusted group may be provisioned by a user before establishment of a trusted group. The provision of a trusted group may include a user registering or providing information for each of the two or more devices which will be part of the trusted group. For example, the user may provide identifying information, such as cell phone numbers, IP addresses, or other types of identifying information for the two or more devices. The user or the device, automatically in response to the provision of identifying information, can provide authentication credentials for each of the devices. The authentication credentials may be later exchanged to react to lock or unlock states. The authentication information may be provided to the account manager 214 and stored in the account policy database 216 and/or credentials database 104.

Further, the user may dictate how the single sign on, within the trusted group, is conducted based on different events. Thus, the user can define a policy for how the trusted group will react to lock and unlock states. This user-defined information is presumed to be known by the trusted group before the establishment of the trusted group. The user can provision any device and may add or subtract devices from the trusted group. For example, the user can include the user's cellular phone, desktop telephone, desktop computer, and personal digital assistant in a single trusted group in which those devices may interact with each other.

After provisioning, the devices may establish a trusted group as described in FIG. 3. FIG. 3 will be described in conjunction with FIGS. 1 and 2. A device 202, running an SSO application 206, can send a SIP registration and subscribe message to the session manager 210, in step 302. The SIP registration message requests that the device 202 be registered, provided with an IP address, and subscribed to the trusted group. The device 202, with the SSO application 206, already knows that the device 202 is part of a trusted group and requests the session manager 210 to register the device 202 to listen for events that the session manager 210 may receive. This registration message can be responded to by registering the device 202 and providing event information from the session manager 210 to the device 202 thereinafter.

A second device 204 may send a second registration subscription message to the session manager 210, in step 304. Device 202 is already registered with session manager 210. Thus, in response to receiving the second registration message in step 304, the session manger 210 can send a notification message to device 202 to notify device 202 of the registration of device 204, in step 306. A notification message can include information about device 204. For example, the notification message 306 can include the IP address of device 204 that may be used by device 202 to communicate with device 204. Further, the session manager 210 can send a notification message to device 204 to alert device 204 of the existence of device 202, in step 308. This notification message can include information about device 202, such as the IP address of device 202.

In response to receiving the notification message in step 306, device 202 can send a SIP invite message, in step 310, to device 204. In embodiments, the SIP invite message is passed through the session manager 210, in step 312, to device 204. The invite messages, sent in steps 310 and 312, can include a self-signed credential from device 202 to device 204. The self-signed credential can be a set of authentication information known by device 202 and device 204. The self-signed credential allows device 204 to identify device 202 as a member of the trusted group and continue communications with device 202. The self-signed credential can be any type of authentication information that can be verified through different encryption methods, including, for example, pretty good privacy (PGP) or other public or private key encryption methods.

In response to receiving the invite message in step 312, device 204 can send a "200 OK" message as a response, in step 314. In embodiments, the 200 OK message may be sent through the session manager 210, which passes the 200 OK message to device 202, in step 316. The 200 OK messages, send in steps 314 and 316, include the self-signed credentials of device 204 that is provided to device 202. As such, the device 202 can authenticate the identity of device 204 with this authentication information in the self-signed certificate. Device 204 also sends a SIP ACK in step 317.

Once the authentication of the devices is confirmed by each of the members of the trusted group, the trusted group can form a secure connection, in step 318. Device 202 or device 204 then start communicating or exchange port information to establish a persistent TLS connection over a defined port. This direct socket connection information can be exchanged between devices such that any subsequent even information may be passed over the persistent TLS connection. Thus, the TLS connection is established, in step 320, from device 204 to device 202 and/or the TLS connection is established between device 202 and device 204, in step 318. Any event information thereinafter can be passed directly between the members of the trusted group. There is no need for TLS tunneling as the trusted group forms a persistent, secure, and direct connection. Further, this TLS connection is more secure as it doesn't pass through other devices but, instead, the TLS connection is provided between the devices automatically.

Figure 4:
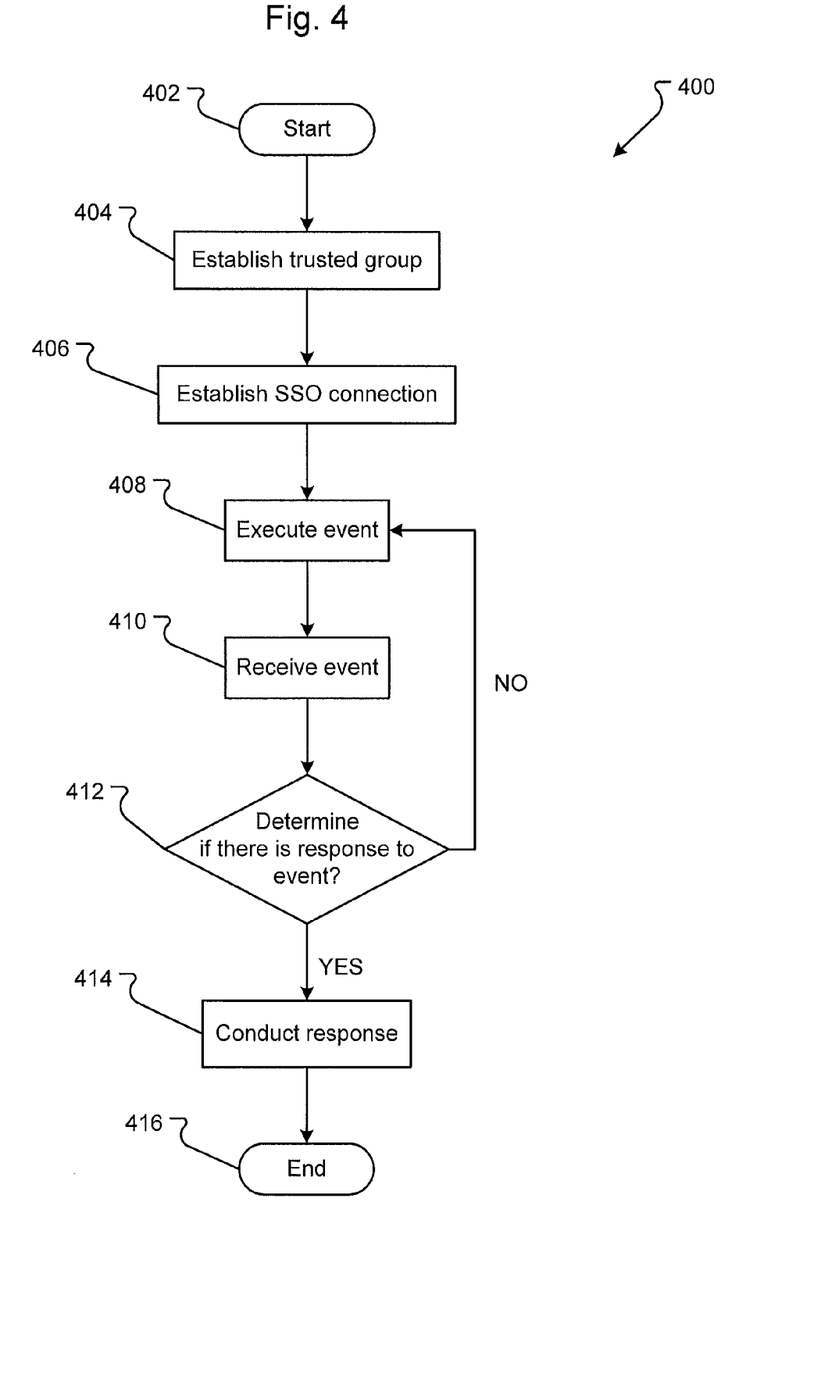
FIG. 4 is a flow diagram of an embodiment of a process for administering a trusted group.

An embodiment 400 for conducting a trusted group is shown in FIG. 4. Generally, the method 400 begins with a start operation 402 and terminates with an end operation 416. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, user interfaces, etc. described in conjunction with FIGS. 1-3.

A trusted group is established, in step 404. The establishment of the trusted group can be similar to that described in FIG. 3. Regardless, two or more devices are registered in a trusted group and may subsequently communicate with each other. The trusted group may then establish a single sign on connection, in step 406. The SSO connection can be a secure connection, such as a persistent TLS connection described in conjunction with FIG. 3. This establishment of the SSO connection can be conducted through the exchange of direct socket connection information between the different members of the trusted group as described in conjunction with FIG. 3. After the establishment the trusted group and the establishment of the SSO connection, the different devices may execute different applications or conduct communications as is customary with the devices. These different device actions are known in the art for those different devices.

One of the devices of the trusted group may execute an event, in step 408. An event may be any type of action that can change the state of the device. For example, an event can include a lack of activity for a predetermined period of time, which causes a screen saver or other lock application to execute, can be the transport of the device away from the other members of the trusted group, or some other action that creates a change in the state of the lock/unlock application. Upon executing the event in step 408, or before the execution of the event, the SSO application 206 can send the event to one or more other members of the trusted group.

One or more other members of the trusted group can receive the event, in step 410. The event may be received over the persistent TLS connection 212 at the predetermined port listened to by the other devices. The event may be associated with information sent with the event; the information associated with the event may include credentials for the device sending the event or the device receiving the event. The event may also describe what has happened to allow the other members of the trusted group to determine how to respond to the event. This information is received by the SSO application 206 of the receiving device, where the receiving device determines if there is a response to the event, in step 412.

The SSO application can review the information about the event and apply one or more of the policies established by the user and provided from the account manager 214 and stored in the account policy database 216. The account policies may direct how one or more of the devices respond to any type of event that is received from one or more of the other devices in the trusted group. Based on the review of the event and according to the policy from the policy database 216 and applied by the SSO application 206, the device may determine if there is a response or if there is not a response to the event. If there is no response, step 412 proceeds "NO" back to step 408 to wait for another event. However, if there is a response to the event, step 412 proceeds "YES" to step 414.

The other devices of the trusted group conduct a response, in step 414. For example, if the event is to lock one of the members of the trusted group, the response may be to lock all the members of the trusted group, so that no member of the trusted group can be used. In other embodiments, if the event is to unlock a device, the other devices may respond by unlocking. However, depending on the situation and the policies or directions established by the user and provided by the account manager 214, the other devices may respond differently depending on the event.

A series of use cases provided hereinafter are helpful for understanding the execution and operation of the trusted group. First, presume an example user environment where a user has a desk phone, a cell phone, a desktop computer, and a laptop computer in her office. The user has installed the SSO application on all the devices. Further, the user has gone through provisioning steps to associate all the devices in a SSO trust group. The adding/deleting of any device from the SSO trust group may require manual acknowledgement from the user. In embodiments, a unique identifier (e.g. the phone extension) is used to uniquely identify the SSO trust group. The SSO applications on all devices setup a secure communication channel (using secure transport like TLS, IPSec, etc.) to communicate to each other. Also, the user may need to provide unlock credentials to SSO application for various the devices in the SSO trust group.

In a first example, the user locks the desktop computer and leaves the office. All the other devices in the SSO trust group (i.e., the cell phone, the desk phone, the user's laptop computer) receive the lock trigger from user's desktop computer over the TLS connection. The desk phone and/or the user's laptop computer can ensure that the user's desktop computer is physically located near the other device using IP subnet verification (i.e., are the devices in the same subnet). Once verification is completed, the SSO application on the desktop phone and the laptop computer triggers device locks for those devices. Various mechanisms for identifying physical proximity can be used in this example. For example, it is also possible to identify some devices as stationary (e.g., the desktop computer, the desk phone) and no physical proximity discovery may be needed for the stationary devices. The cell phone may then ensure that the desktop computer is physically near, e.g., the desktop computer is connected to the cell phone using Bluetooth. Then, the SSO application, on the cell phone, triggers the cell phone to lock. The desktop computer unlock use case is similar to the lock use case, and all devices in the SSO trust group can unlock themselves in a similar manner.

In a second example, the user leaves their office and does not lock the desktop computer. After some time, an inactivity timeout occurs on the desktop computer and locks the desktop computer. All the other devices in the SSO trust group (e.g., the cell phone, the desk phone, the user laptop computer) receive the lock trigger from the desktop computer. The desk phone and/or the user's laptop computer ensures that the desktop computer is in substantial physical proximity using IP subnet verification (i.e., all the devices are in the same subnet). Once verification is completed, the SSO application on the desk phone and/or the user laptop computer triggers device locks on those devices. The cell phone ensures that the desktop computer is in substantial physical proximity because the desktop computer is connected to cell phone using a Bluetooth connection. The SSO application on the cell phone the trigger the cell phone to lock. The use case involving a desktop computer unlock is similar as this desktop computer lock use case, and all devices in the SSO trust group can unlock themselves in that use case.

In a third example, a user leaves the office with the cell phone. The desktop computer gets a Bluetooth disconnect trigger from the cell phone. Then, the desktop computer checks the SSO policy which includes a directive that a Bluetooth disconnect shall lock the desktop computer. The SSO application on the desktop computer triggers device locks for the SSO trust group. All the other devices in the SSO trust group (e.g., the cell phone, the desk phone, the laptop computer) receives the lock trigger from the desktop computer. In alternative embodiments, some subset of devices receive the lock trigger. For example, all devices but the cell phone locks or all devices but the cell phone and the laptop lock. In this way, a provisioned locking is implemented that can manage the devices based on the parameters of the situation encountered by the SSO trust group. The provisioned locking can be based on rules either automatically generated or generated by the user. The desk phone and/or laptop computer ensures that user desktop computer is physically close using IP subnet verification. Once physical proximity is verified, the SSO application on the desk phone and/or the laptop computer triggers the desk phone and the laptop computer to lock.

In a final example, the user enters her office with her unlocked cell phone. The desktop computer connects to the cell phone using Bluetooth (the Bluetooth connection ensures that the cell phone, and therefore the user, is physically close). The desktop computer may then connect to the cell phone over the SSO channel and determine that the cell phone device state is unlocked. The SSO application, in the desktop computer, triggers a device unlock for the desktop computer. Then, the desktop computer unlock triggers other devices, in the SSO trust group, to unlock. The desk phone and/or the laptop computer ensures that the desktop computer is physically close using IP subnet verification. After the verification completes, the SSO application on the desk phone and/or the laptop computer triggers device unlocks for the desk phone and/or laptop computer, respectively.

FIG. 5 illustrates a block diagram of a computing environment 500 that may function as system or environment for the embodiments described herein. The system 500 includes one or more user computers 505, 510, and 515. The user computers 505, 510, and 515 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 505, 510, 515 may also have any of a variety of applications, including for example, database client and/or server applications, and web browser applications. Alternatively, the user computers 505, 510, and 515 may be any other electronic device, such as a thin-client computer, Internet-enabled mobile telephone, and/or personal digital assistant, capable of communicating via a network (e.g., the network 520 described below) and/or displaying and navigating web pages or other types of electronic documents. Although the exemplary system 500 is shown with three user computers, any number of user computers may be supported.

System 500 further includes a network 520. The network 520 can be any type of network familiar to those skilled in the art that can support data communications using any of a variety of commercially-available protocols, including, without limitation, TCP/IP, SNA, IPX, AppleTalk, and the like. Merely by way of example, the network 520 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 500 may also include one or more server computers 525, 530. One server may be a web server 525, which may be used to process requests for web pages or other electronic documents from user computers 505, 510, and 515.

The web server can be running an operating system including any of those discussed above, as well as any commercially-available server operating systems. The web server 525 can also run a variety of server applications, including HTTP servers, FTP servers, CGI servers, database servers, Java servers, and the like. In some instances, the web server 525 may publish operations available operations as one or more web services.

The system 500 may also include one or more file and or/application servers 530, which can, in addition to an operating system, include one or more applications accessible by a client running on one or more of the user computers 505, 510, 515. The server(s) 530 may be one or more general purpose computers capable of executing programs or scripts in response to the user computers 505, 510 and 515. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 530 may also include database servers, including without limitation those commercially available from Oracle, Microsoft, Sybase™, IBM™ the like, which can process requests from database clients running on a user computer 505.

The web pages created by the web application server 530 may be forwarded to a user computer 505 via a web server 525. Similarly, the web server 525 may be able to receive web page requests, web services invocations, and/or input data from a user computer 505 and can forward the web page requests and/or input data to the web application server 530. In further embodiments, the server 530 may function as a file server. Although for ease of description, FIG. 5 illustrates a separate web server 525 and file/application server 530, those skilled in the art will recognize that the functions described with respect to servers 525, 530 may be performed by a single server and/or a plurality of specialized servers, depending on implementation-specific needs and parameters. The computer systems 505, 510, and 515, file server 525 and/or application server 530 may function as servers or other systems described herein.

The system 500 may also include a database 535. The database 535 may reside in a variety of locations. By way of example, database 535 may reside on a storage medium local to (and/or resident in) one or more of the computers 505, 510, 515, 525, 530. Alternatively, it may be remote from any or all of the computers 505, 510, 515, 525, 530, and in communication (e.g., via the network 520) with one or more of these. In a particular set of embodiments, the database 535 may reside in a storage-area network ("SAN") familiar to those skilled in the art. Similarly, any necessary files for performing the functions attributed to the computers 505, 510, 515, 525, 530 may be stored locally on the respective computer and/or remotely, as appropriate. In one set of embodiments, the database 535 may be a relational database, such as Oracle 10i™, that is adapted to store, update, and retrieve data in response to SQL-formatted commands. Database 535 may be the same or similar to the database used herein.

FIG. 6 illustrates one embodiment of a computer system 600 upon which servers or other systems described herein may be deployed or executed. The computer system 600 is shown comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage device 620. By way of example, storage device(s) 620 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. In some embodiments, the computer system 600 may also include a processing acceleration unit 635, which can include a DSP, a special-purpose processor and/or the like.

The computer-readable storage media reader 625 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 620 and/or any other computer described above with respect to the system 600. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 640, including an operating system 645 and/or other code 650, such as program code implementing the servers or devices described herein. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail.

In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A non-transient computer program product including computer executable instructions stored onto a computer readable medium which, when executed by a processor of a computer, causes the computer to perform a method for establishing a trusted group, the instructions comprising:
    instructions to define the trusted group including two or more devices;
    instructions to receive a session initiation protocol (SIP) registration for a first device;
    instructions to receive a subscribe message from the first device to subscribe to the trusted group;
    in response to the SIP registration, instructions to send a notification to the first device, the notification providing information of a second device that is already registered and subscribed to the trusted group;
    instructions to pass a SIP invite message from the first device to the second device, the SIP invite message including a self signed certificate fingerprint for the first device;
    in response to the SIP invite message, passing a 200 OK message from the second device to the first device, wherein the 200 OK message includes a self signed certificate fingerprint for the second device; and
    wherein, in response to the 200 OK message, the first device and the second device establish a persistent transport layer security (TLS) connection to pass lock or unlock events between the first device and the second device.

2. The computer program product as defined in claim 1, further comprising instructions to execute an application for the first device or the second device.

3. The computer program product as defined in claim 2, further comprising instructions to administer a communication from or to the first device or the second device.

4. The computer program product as defined in claim 3, further comprising:
    instructions to receive, by the first device, an event from the second device of the trusted group over the persistent TLS channel, the event indicating an unlock or lock of the second device; and
    based on the event, instructions to unlock or lock the first device of the trusted group.

5. A trusted group of devices comprising:
    a first communication device comprising:
        a memory that stores a lock/unlock application;
        a processor in communication with the memory, the processor that executes the lock/unlock application;
    a computing device comprising:
        a second memory that stores a second lock/unlock application;
        a second processor in communication with the second memory, the second processor that executes the second lock/unlock application;
    a session manager in communication with the first communication device and the computing device, the session manager that:
        receives a session initiation protocol (SIP) registration for the first communications device;
        receives a subscribe message from the first communication device to subscribe to a trusted group, the trusted group including the first communication device and the computing device;
        in response to the SIP registration, sends a notification to the first communication device, the notification providing information of the computing device that is already registered and subscribed to the trusted group;
        passes a SIP invite message from the computing device to the first communication device, the SIP invite message including a self signed certificate fingerprint for the computing device;
        in response to the SIP invite message, passes a 200 OK message from the first communication device to the computing device, wherein the 200 OK message includes a self signed certificate fingerprint for the first communication device; and
    wherein, in response to the 200 OK message, the first communication device and the computing device establish a persistent transport layer security (TLS) connection to pass lock or unlock events between the first communication device and the computing device.

6. The computer program product as defined in claim 1, wherein the first device is a desktop computer and the second device is a cell phone and further comprising:
    instructions for the desktop computer to pass the lock event to the cell phone;
    in response to receiving the lock event at the cell phone, instructions to ensure that the desktop computer is in physical proximity to the cell phone; and
    in response to receiving the lock event and ensuring that the desktop computer is in physical proximity to the cell phone, locking the cell phone.

7. The computer program product as defined in claim 1, further comprising:
- instructions for the first device to pass the lock event to the second device;
- in response to receiving the lock event at the second device, instructions to ensure that the first device is physically located near the second device using IP subnet verification; and
- in response to receiving the lock event and ensuring that the first device is physically located near the second device, instructions to lock the second device.

8. The computer program product as defined in claim 1, wherein the first device is a desktop computer and the second device is a cell phone and further comprising:
- instructions to receive a Bluetooth disconnect trigger from the cell phone;
- in response to receiving the Bluetooth disconnect trigger, instructions to pass the lock event to the desktop computer; and
- instructions to lock the desktop computer.

9. A method for a secure sign on, comprising:
- establishing, by a first device, a secure communications channel with at least a second device of a trusted group, wherein the secure communications channel is a persistent transport layer security (TLS) connection for communicating events between two or more IP enabled devices of the trusted group and wherein establishing the secure communications channel comprises:
  - sending a session initiation protocol (SIP) registration to a session manager;
  - in response to the SIP registration, receiving a notification from the session manager, the notification providing information of another device that is part of the trusted group;
  - sending a SIP invite message to the other device;
  - in response to the SIP invite message, receiving a direct socket link for the persistent TLS connection; and
  - in response to the receiving the direct socket link for the persistent TLS connection, establishing the persistent TLS connection;
- receiving, by the first device, an event from the at least one second device of the trusted group over the secure communication channel, the event indicating an unlock of the at least one second device; and
- based on the event, unlocking the first device of the trusted group.

10. The method as defined in claim 9, wherein the SIP invite message includes a self signed certificate fingerprint and is the SIP invite is based on a telephone call.

11. The method as defined in claim 9, wherein the event includes unlock credentials.

12. The method as defined in claim 11, further comprising:
- executing, by the first device, a second event, wherein the second event comprises locking of the first device;
- sending the second event to the at least one second device of the trusted group; and
- wherein the at least one second device is locked in response to the second event.

13. The method as defined in claim 12, further comprising subscribing to the session manager to receive event messages from the two or more devices comprising the trusted group.

14. The trusted group as defined in claim 5, wherein the session manager is executed on a server.

15. The trusted group as defined in claim 5, wherein the session manager is executed on one of the computing device or the first communication device.

16. The trusted group as defined in claim 5, wherein the first communication device is one of a group consisting of a cellular phone, a personal digital assistant, a laptop computer, an IP-enabled desktop telephone, a telephone application executing in a computer system, and a desktop telephone.

17. The trusted group as defined in claim 5, wherein the computing device is one of a group consisting of a personal digital assistant, a laptop computer, a desktop computer, and a server.

18. The trusted group as defined in claim 5, wherein the computing device further:
- receives an event from the first communication device of the trusted group over the persistent TLS connection, the event indicating an unlock or lock of the first communication device and
- based on the event, unlocks or locks the computing device of the trusted group.

19. The trusted group as defined in claim 18, wherein the session manager
- receives presence information for the computing device or the first communication device,
- sends the presence information to the computing device or the first communication device, and
- wherein the presence information is read by either the computing device or the first communication device to determine if the event should be responded to.

20. The trusted group as defined in claim 19, further comprising a credentials database in communication with the first and second lock/unlock application, the credentials database
- stores credentials for the computing device and the first communication device and
- provides the stored credentials to the computing device and the first communication device.

* * * * *

UNITED STATES PATENT AND TRADEMARK OFFICE
CERTIFICATE OF CORRECTION

PATENT NO.      : 8,464,063 B2                              Page 1 of 1
APPLICATION NO. : 13/042201
DATED           : June 11, 2013
INVENTOR(S)     : Amit Agarwal et al.

It is certified that error appears in the above-identified patent and that said Letters Patent is hereby corrected as shown below:

In the Claims:

Column 17, line 49, please delete "and is the SIP invite" and insert --and the SIP invite--.

Column 18, line 26, please delete "further:" and insert --further--.

Signed and Sealed this
Eighteenth Day of February, 2014

Michelle K. Lee
*Deputy Director of the United States Patent and Trademark Office*